UNITED STATES PATENT OFFICE.

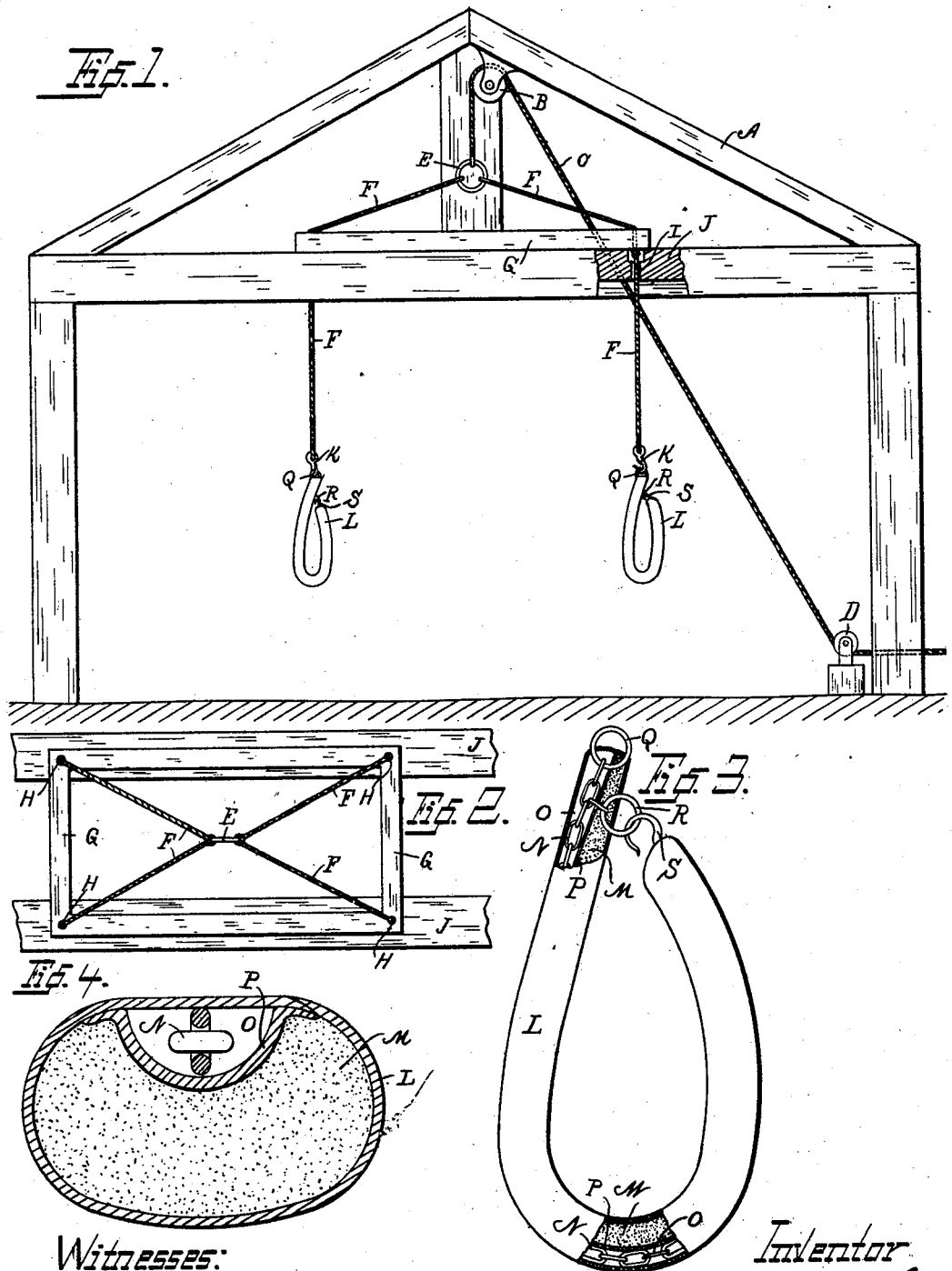

BENNO KOCH, OF HEBRON, NORTH DAKOTA.

LIFTING DEVICE FOR ANIMALS.

SPECIFICATION forming part of Letters Patent No. 678,117, dated July 9, 1901.

Application filed July 5, 1900. Serial No. 22,477. (No model.)

*To all whom it may concern:*

Be it known that I, BENNO KOCH, a citizen of the United States, residing at Hebron, county of Morton, and State of North Dakota, have invented new and useful Improvements in Lifting Devices for Animals, of which the following is a specification.

My invention relates to improvements in devices for suspending animals while surgical operations are being performed upon them.

The object of my invention is to provide a form of device which will support the animal in a raised position without interfering with the circulation of the blood, it being found that the usual method of passing bands around the body of the animal seriously impairs the circulation.

In the following description reference is had to the accompanying drawings, in which—

Figure 1 is a side view of my invention with a portion of one of the frame-beams broken away to show the location of the suspensory-rope. Fig. 2 is a detail view showing four suspensory-ropes and the spreader by means of which they are separated, together with a portion of two of the frame-beams. Fig. 3 is an enlarged detail view of one of the leg-engaging collars, partially broken away to show the interior construction. Fig. 4 is a cross-sectional view of one of the collar-wales.

A is a supporting-frame, provided with a pulley B in the upper portion thereof, over which a rope C is passed, the latter extending downwardly around a pulley D and outwardly to the point where the lifting power is applied. The other end of the rope C is secured to a ring E, to which four suspensory-ropes F are also secured. The ropes F are separated by means of a movable frame G, which serves as a spreader, the ropes being arranged to pass through apertures H in the respective corners of the frame G and downwardly through apertures I in the frame-bars J. The ropes may be knotted, as shown in Fig. 1, or otherwise secured to prevent them from slipping in the spreader-frame G, and as they are passed through the aperture I in the fixed frame-bars J it is obvious that they will not twist or turn when the animal is lifted. The lower ends of the suspensory-ropes F are provided with hooks K to facilitate their attachment to the collars L. The collars L are adapted to engage the leg of the animal in close proximity to the body, whereby the animal may be supported in an upright position and prevented from turning over by the ropes. The outer covering is made of leather or other suitable material, with a filling M of sawdust or equivalent material. In order to secure the desired strength, however, I have reinforced the collar with a chain N, which extends through a channel O in the rear portion of the collar. The channel may be conveniently formed by means of a partition P, which is secured to the back surface of the collar, as best shown in Fig. 4, thereby preventing the chain from working through the filling M to the front or contact surface of the collar. The chain is provided with a ring Q for engagement with the hook K of the suspensory-ropes and also with the ring R and hook S, by means of which the two ends of the collar may be secured together. In use the collars are passed around the legs of the animal near the body, and the ends of the collars are secured together, as shown in Fig. 3. The hooks K are then engaged in the rings Q, when by drawing upon the rope C the animal may be raised from the surface of the ground and suspended in an upright position pending the operation.

Having thus described my invention, what I claim as new, and desire to secure by Letters Patent, is—

1. The combination of a supporting-frame; a draft-rope; four suspensory-ropes connected therewith; and a collar secured to the lower end of each suspensory-rope; said collars being adapted to be engaged around the legs of an animal.

2. In an animal-lifting device, a leg-engaging collar comprising an inclosing cover; a filling of sawdust or equivalent material; a chain secured in the rear portion of said collar and adapted to secure the ends thereof together and furnish means for attachment to the suspensory devices, substantially as herein set forth.

3. The combination with a supporting stationary frame; a draft-rope, extending over suitable pulleys in the upper portion of the frame; a movable spreader-frame connected with the draft-rope; four suspensory-ropes depending from the spreader-frame; a collar secured to the lower end of each suspensory-rope, and adapted to engage around a leg of the animal; and guides on said stationary frame adapted to prevent the spreader-frame and ropes from revolving.

In testimony whereof I affix my signature in the presence of two witnesses.

BENNO KOCH.

Witnesses:
HENRY KRAUTT,
WM. KLICK.